Figure 1:
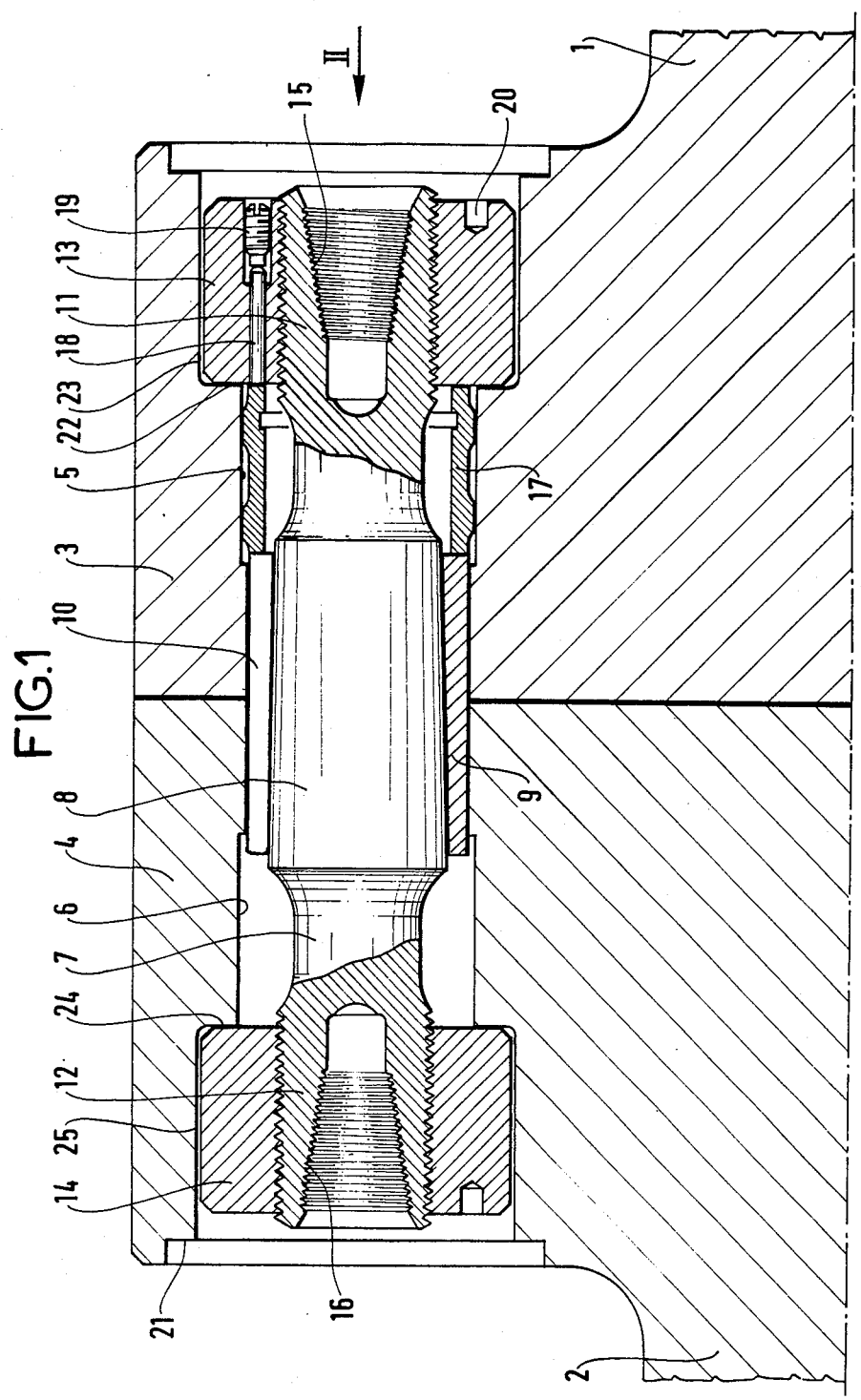

United States Patent [19]

Goy

[11] Patent Number: 4,685,188
[45] Date of Patent: Aug. 11, 1987

[54] METHOD OF COUPLING TWO FLANGED SHAFT ENDS

[75] Inventor: Pierre Goy, Sarcelles, France

[73] Assignee: Alsthom, Paris, France

[21] Appl. No.: 832,203

[22] Filed: Feb. 24, 1986

[51] Int. Cl.⁴ ............................................. B23P 11/02
[52] U.S. Cl. ....................................... 29/446; 29/525;
   29/526 R; 403/14; 403/337; 403/371; 411/45;
                                                    411/55
[58] Field of Search ...................... 29/446, 452, 526 R,
       29/525; 411/44, 426, 45, 55, 166, 389, 271, 63,
                           64; 403/14, 16, 337, 336, 335, 371

[56] References Cited

U.S. PATENT DOCUMENTS

| | | | |
|---|---|---|---|
| 3,130,628 | 4/1964 | Blinn | 411/367 |
| 3,173,522 | 3/1965 | Zimmer et al. | 403/337 |
| 4,048,898 | 9/1977 | Salter | 411/44 |
| 4,089,613 | 5/1978 | Babbitt, Jr. | 403/371 X |
| 4,140,040 | 2/1979 | Modrey | 411/45 |
| 4,192,621 | 3/1980 | Barth | 403/337 X |
| 4,274,755 | 6/1981 | Bernasconi | 403/337 |
| 4,304,502 | 12/1981 | Stratienko | 403/371 X |
| 4,496,259 | 1/1985 | Foucher | 411/55 X |
| 4,607,971 | 8/1986 | Hartmann et al. | 403/337 X |

FOREIGN PATENT DOCUMENTS 446683  12/1974  U.S.S.R. ............................... 403/337

Primary Examiner—Charlie T. Moon

Attorney, Agent, or Firm—Sughrue, Mion, Zinn, Macpeak & Seas

[57] ABSTRACT

Coupling of two flanged shafts end-to-end by means of taper pin bolts and expansion sleeves cooperating with the pin bolts and having the same conicity, said sleeves extending into bores provided in said flanges and said pin bolts having external threads on both ends, a first end being located on the small side of the taper cone and a second end on the large side of the cone, is accomplished by:
(a) inserting each pin bolt together with its sleeve into the corresponding bores,
(b) screwing a nut onto the first end of the pin,
(c) exerting a tractive force on the second end by means of a cylinder, the nut of the first end bearing against the corresponding flange,
(d) while maintaining the tractive force on the second end, applying a nut against the second corresponding flange by screwing the nut up on the second end of the pin bolt,
(e) and pushing back the sleeve toward said second end and cancelling the action of the cylinder.

The device for carrying out this procedure is also specified, which enables transfer of both torsional and bending moments between flanges using only one type of pin bolt, having a simple design and enabling backlash-free coupling.

1 Claim, 2 Drawing Figures

METHOD OF COUPLING TWO FLANGED SHAFT ENDS

This invention relates to a method of coupling two flanged shafts end-to-end by means of taper pin bolts and expansion sleeves cooperating with the pin bolts and having the same conicity, said sleeves extending into bores provided in the flanges and said pin bolts having external threads on both ends, a first end being located beyond the small end of the cone and a second end beyond the large end of the cone.

Such a method is already known from U.S. Pat. No. 4,192,621.

In this known method, each pin bolt transfers both the torsional moments and the bending moments.

For purposes of installing these pins and in any case for removing them, their conical shank has been provided with circumferential grooves supplied with a fluid under pressure to push the sleeves out from the conical shank part of the pin. This device complicates manufacture.

The method according to the present invention allows more easily machined pins to be employed which nevertheless also transfer both torsional and bending moments, said method involving the following steps:
(a) each pin bolt together with its sleeve is inserted into the corresponding bores of the flanges,
(b) a nut is screwed onto the first end of the pin,
(c) a tractive force is exerted on the second end of the pin by means of a hydraulic or air cylinder, the nut on the first end bearing against the corresponding flange,
(d) while maintaining the tractive force on the second end of the pin, a nut is screwed up on said second end to apply against that corresponding flange,
(e) and the sleeve is pushed back toward said second end and the action of the cylinder cancelled.

The invention also provides a device for implementing this procedure, comprising a taper pin bolt, an expandable conical sleeve having internally the same conicity as the pin and externally a cylindrical shape, said pin bolt been provided with a nut and a tractive grip at each end, wherein a standoff is provided between the nut on said first end of the pin and the sleeve, said standoff bearing upon the said sleeve and being urged toward the sleeve by means of screws traversing the said nut, and wherein the sleeve is longitudinally slit.

Figure 2:
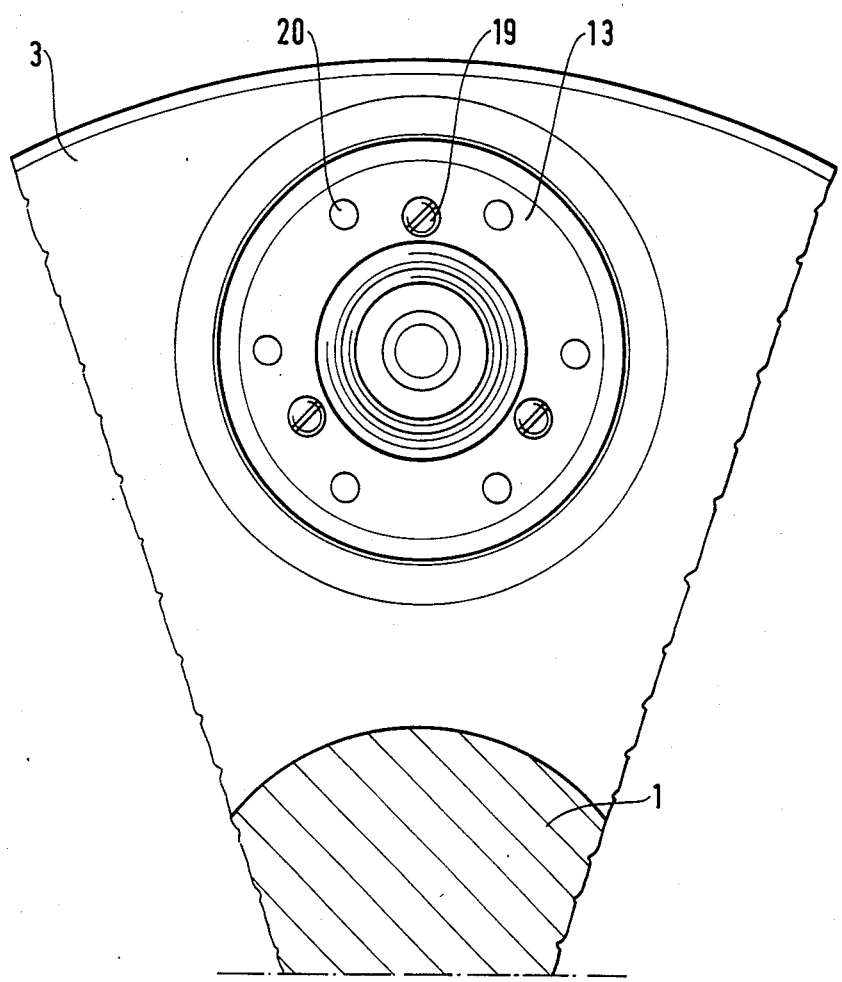

The invention will be more readily understood in the light of the following description, with reference to the appended drawings in which FIG. 1 is a longitudinal section through the coupling device according to the invention and FIG. 2 is a partial end view of the device in FIG. 1.

The device according to the invention serves to couple two shafts 1 and 2, each having a flange 3, 4.

Each flange 3, 4 has bores such as 5 and 6 which correspond with bores in its facing flange.

The device comprises a pin bolt 7 with a tapered center portion or shank 8. The shank 8 fits into a sleeve 9 having a longitudinal slit 10.

The sleeve 9 is internally tapered with the same conicity as the shank 8 of the pin bolt 7 and is cylindrical on the outside.

The pin bolt 7 has a first end 11 on the small side of its cone and a second end 12 on the large side of its cone Each end 11, 12 is threaded and receives a nut 13, 14. Moreover, each end 11, 12 has a tapped axial, conical bore 15, 16 designed to receive, when required, a gripping member attached to a hydraulic pulling cylinder.

Between the nut 13 screwed onto the first end of the pin bolt 11 and the sleeve 9 is a standoff 17 which bears against the sleeve 9 and is urged forward by three smaller pins 18 pushed by screws 19 in the nut 13.

The nuts 13, 14 are equipped with cylindrical holes 20 to provide a grip for their screwing and unscrewing (see FIG. 2).

The coupling method or procedure according to the invention is as follows.

The pin bolt 7, sleeve 9, standoff 17 and nuts 13, 14 assembly is inserted into the flange bores as illustrated in FIG. 1 such that the sleeve 9 straddles the two flange bores 5 and 6 of flanges 3 and 4, the slit 10 in the sleeve being placed at the top of the coupling.

A hydraulic cylinder comes to exert a force between the conical tapping 16 in the second end 12 of the pin bolt and the face 21 of the flange 4.

Since the nut 13 screwed onto the first end 11 of the pin bolt applies against the bottom 22 of a countersink 23 in flange 3, the tractive effort applies to the other end brings about an elongation of the pin 7 such that, due to the effectivity of Poisson's ratio, the diameter of the cone shrinks and a radial clearance is created between the conical surfaces of the pin 7 and the sleeve 9. The second nut 14 is then screwed up to apply to the bottom 24 of the countersink 25 in the flange 4 containing said nut 14.

To eliminate the play associated with axial movement of the sleeve 9 in relation to the pin 7, in the direction from the small end of the taper pin to the large end, the screws 19 of nut 13 are then screwed in, pushing the small straight pins 18 to urge back the standoff 17. Hydraulic pressure is thereafter removed from the cylinder and the cylinder withdrawn.

To uncouple the shafts, it is only necessary to refit the cylinder to the second end 12 of the pin bolt 7 and to exert a force enabling the nut 14 to be unscrewed.

If necessary, the cylinder can be dismantled and installed at the opposite end of the coupling to exert a force via the conical tapping 15.

The nut 14 is removed. A slight hydraulic pressure in the cylinder enables the sleeve 9 to be released from the holes 5 and 6. The cylinder is removed, then the pin bolt 7 and sleeve 9 assembly is removed after unscrewing the nut 13, pushing the pin bolt 7 in the direction of the first end 11 to the second end 12.

What is claimed is:

1. A method of coupling two flanged shafts end-to-end by means of cone-shaped taper pin bolts and longitudinally slit expansion sleeves having a cylindrical exterior and a cone-shaped interior cooperating with the pin bolts and having the same conicity, said sleeves extending into aligned cylindrical bores provided in flanges on said shafts and said pin bolts having external threads on both ends, a first end being located at the small end of the cone and a second end at the large end of the cone, said method involving the following steps:
   (a) inserting each pin together with its sleeve into the corresponding bores of the two flanges,
   (b) screwing a nut onto the first end of the pin bolt, nearest the small end of the taper,
   (c) exerting a tractive force on the second end of the pin by means of a hydraulic or air cylinder, the nut on the first end bearing against the corresponding flange,
   (d) while maintaining the tractive force on the second end of the pin, screwing a nut up on said second end to apply against that corresponding flange,
   (e) and pushing the sleeve back toward said second end and terminating the tractive force of the cylinder on the second end of the pin bolt.

* * * * *